United States Patent
Zhao et al.

(10) Patent No.: US 11,797,507 B2
(45) Date of Patent: Oct. 24, 2023

(54) RELATION-ENHANCEMENT KNOWLEDGE GRAPH EMBEDDING METHOD AND SYSTEM

(71) Applicant: Huazhong University of Science and Technology, Wuhan (CN)

(72) Inventors: Feng Zhao, Wuhan (CN); Langjunqing Jin, Wuhan (CN); Hai Jin, Wuhan (CN)

(73) Assignee: HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 0 days.

(21) Appl. No.: 17/821,633

(22) Filed: Aug. 23, 2022

(65) Prior Publication Data
US 2023/0297553 A1 Sep. 21, 2023

(30) Foreign Application Priority Data
Mar. 16, 2022 (CN) .......................... 202210275727.5

(51) Int. Cl.
G06F 16/22 (2019.01)
G06F 16/28 (2019.01)
G06F 40/30 (2020.01)

(52) U.S. Cl.
CPC ........ G06F 16/2228 (2019.01); G06F 16/288 (2019.01); G06F 40/30 (2020.01)

(58) Field of Classification Search
CPC ..... G06F 16/2228; G06F 16/288; G06F 40/30
See application file for complete search history.

(56) References Cited

U.S. PATENT DOCUMENTS

| | | | | |
|---|---|---|---|---|
| 2022/0398504 A1* | 12/2022 | Chae | ...................... | G06N 3/045 |
| 2022/0414490 A1* | 12/2022 | Murakami | ............ | G06N 20/00 |
| 2023/0162054 A1* | 5/2023 | Okajima | ................ | G06N 5/022 |
| | | | | 706/46 |

FOREIGN PATENT DOCUMENTS

CN 111680162 A 9/2020

* cited by examiner

*Primary Examiner* — Etienne P Leroux
(74) *Attorney, Agent, or Firm* — Michael Ye; Rimon Law

(57) ABSTRACT

The present invention relates to a relation-enhancement knowledge graph embedding method and system, wherein the method at least comprises: performing collaborative coordinate-transformation on entities in the knowledge graph; performing relation core enhancement by means of relation-entropy weighting, so as to endow entity vectors with strong relation property; building an interpretability mechanism for a knowledge graph embedding model, and accounting for effectiveness and feasibility of the relation enhancement by proving convergence of the knowledge graph embedding model; and using a dynamic parameter-adjusting strategy to perform learn representation learning of to the vectors in the knowledge graph, and configuring deviation control to ensure accurate embedding. The present invention can measure rationality of facts with improved accuracy, prove through reasoning the modeling ability of the model from the perspective of complex relation pairs, perform vector computing for entities and relations, thereby accomplishes knowledge graph embedding and reasoning.

20 Claims, 3 Drawing Sheets

RELATION-ENHANCEMENT KNOWLEDGE GRAPH EMBEDDING METHOD AND SYSTEM

This application claims the benefits of the Chinese Application No. CN202210275727.5 filed Mar. 16, 2022, which is hereby incorporated by reference as if fully set forth herein.

BACKGROUND OF THE INVENTION

1. Technical Field

The present invention relates to the technical field that knowledge graph embedding, and more particularly to a relation-enhancement knowledge graph embedding method and system.

2. Description of Related Art

Essentially, knowledge graphs represent a unique graphic representation of knowledge bases. A knowledge graph is constructed by entities (nodes) and relations (edges), and often represented in the form of a knowledge triple (h, r, t). It is of great significance in researches and applications of artificial intelligence. In recent years, knowledge graphs have been developed vigorously and some quite valuable information has been obtained. As this technology is applied more and more extensively, many problems have emerged. For example, some knowledge graphs are not complete in graph, the dependency of relations is not valued and some valuable facts are missing. Besides, limited by the closed world assumption, some knowledge graphs are unable to predict new entities and relations, preventing their updating, degrading their richness in terms of topological structure information, and significantly limiting their accuracy and interpretability in various reasoning applications. The present invention provides a relation-enhancement knowledge graph embedding method, which leverages the rich semantic information from relation data to model entities and complex relations, multi-dimension enhances entities and relation vectors in terms of semantic association and importance, the resulting model can have improved interpretability.

Knowledge graph embedding essentially is about learning distributed representations of entities and relations, or entity embedding and relation embedding. It allows representations of low-dimensional dense vectors or matrixes in a continuous vector space while preserving the topological information of the original knowledge graph. It predicts complex semantic information among entities and relations through computing of vectors, thereby significantly improving knowledge graph reasoning in terms of computing efficiency, accuracy, and interpretability. Embedded representations of Entities and relations facilitate the execution of various tasks, such as knowledge graph complementation, relation extraction, entity typing, and entity analysis. Recently, technologies based on translational distance models, geometric models, and neural network models have been hotspots of researches. A translational distance model uses a distance-based score function to translate the relation between entity pairs, and measures rationality of facts according to distances between entity pairs. A geometric model uses different geometric spaces (e.g., complex planes, manifolds, etc.) to model topological structures of entities and relations. A neural network model uses a learning framework to match latent semantics of entities and representational relations in a vector space, so as to measure how reliable a fact is. Relation enhancement has been increasingly used in knowledge graph representation learning. By modeling entities around relations and in view of importance levels of dimensions, more reasonable results can be obtained in prediction of relations. However, researches about this issue are still in the early stage, and there are issues to be addressed: 1) the existing models score inaccurately because of crude measurement, leading to less accurate reasoning; 2) the existing models are based on single entity-relation link, leading to chaotic entity mapping that prevents accurate link prediction; and 3) due to low interpretability, the black box of the model can confuse researchers.

For example, Patent Document No. CN111680162A discloses a knowledge graph embedding method, its system and its equipment based on tensor decomposition. According to the embodiment of the prior invention, the method includes obtaining tensors corresponding to a current knowledge graph; performing Tucker decomposition on the tensor to obtain a decomposed tensor; determining a fact score corresponding to the decomposed tensor; and updating the embedding vector corresponding to the preset knowledge map embedding model according to the fact score, and embedding the current knowledge map through the updated embedding vector. As the core subject of the prior invention, a tensor corresponding to a knowledge graph is basically a vector space composed of numerous vectors in linear combinations. In such a space, all entities, and relations (in the form of vectors) can be represented uniformly. Its computing agent is also matrix (linear combinations of vectors) computing. Therefore, the uniform representation is not applicable to diverse kinds of relation pair representation learning, leading to poor quality of knowledge graph embedding, as well as inaccurate prediction and complementation. This is also the awkwardness seen in most solutions known in the art.

In view of the shortcomings of the prior art, the present invention provides a novel knowledge graph embedding method, which uses vectors to represent triples (head entities, relations, and tail entities) of knowledge graphs, enabling more detailed study into diverse, complex relation pairs. In the method of the present invention, entities and relations are dimensionally reduced into vectors that are then used as computing agents. With representations in the form of vectors, the present invention can accurately represent relation pairs of various kinds (such as symmetric relations, antisymmetric relations, combining relations, etc.) and fundamentally improve quality of knowledge graph embedding, thereby significantly contributing to tasks like prediction and complementation.

In addition, on the one hand, due to the differences in the understanding of those skilled in the art; on the other hand, due to the fact that the applicant studied a large amount of literature and patents when putting the invention, but space limitations do not allow all the details and content are described in detail, however, this does not mean that the invention does not have these prior art features, on the contrary, the present invention already has all the features of the prior art, and the applicant reserves the right to add relevant prior art to the background technology.

SUMMARY OF THE INVENTION

Since existing knowledge graph embedding methods are based on the entity-relation perspective (around entities) and can lead to chaotic entity mapping, making them unable to predict right entities for link prediction in scenarios involving N-to-N relations. Besides, since they leave importance levels of entities unconsidered, they are less effective in reasoning complex relation pairs.

In response to a deficiency of the prior art, the present invention provides a relation-enhancement knowledge graph embedding method, at least comprising:

performing collaborative coordinate-transformation on entities in the knowledge graph;

performing relation core enhancement by means of relation-entropy weighting, so as to endow entity vectors with strong relation property;

building an interpretability mechanism for a knowledge graph embedding model, and accounting for effectiveness and feasibility of the relation enhancement by proving convergence of the knowledge graph embedding model; and using a dynamic parameter-adjusting strategy to perform representation learning to the vectors in the knowledge graph, and configuring deviation control to ensure accurate embedding.

To solve the problems that the conventional knowledge graphs about incomplete information about topological structures and inaccurate many-to-many entity matching, the present invention provides a complex relation-enhancement knowledge graph embedding method and a system thereof, which use Euler transformation to transform coordinates of entities so as to accurately represent topological structures of entities corresponding to complex relations. This process also forms a data basis of the entire knowledge graph embedding model. According to the present invention, entropy weighting is performed around relations, and a covariance matrix is built based on relations. Then vector entropy values and weights in every dimension are computed. Afterward, a weight matrix is constructed and added into a score function for predicting and measuring rationality of facts with improved accuracy. Additionally, the modeling ability of the model is proved through reasoning from the perspective of complex relation pairs. At last, vector computing is performed for entities and relations, thereby accomplishing knowledge graph embedding and reasoning.

Preferably, the step of performing collaborative coordinate-transformation on entities in the knowledge graph at least comprises:

projecting the entities and relation data to a low-dimensional dense vector space, performing positive definite matrix decomposition and Mahalanobis-distance normalization, so as to enhance association between relation pairs and entity pairs; and integrating the coordinates using Euler transformation, so as to improve accuracy and semantic richness in representing an entity topological structure corresponding to complex relations.

Preferably, the step of performing relation core enhancement by means of relation-entropy weighting at least comprises:

weighting the entities in the knowledge graph around the relation pairs so as to obtain vector entropy values and weights in at least one dimension;

constructing a mean matrix of the entities and the relations, selecting corresponding covariances, and constructing a covariance matrix; and computing weight values based on the vector entropy values in at least one dimension and constructing a diagonalized matrix, adding a weight matrix that is formed by combining the diagonalized matrix and the covariance matrix into a score function, and modeling different importance levels of the entities.

The present invention enhances relations in a knowledge graph by weighting entity around relation pairs. The present invention provides union and support 3 to optimization of weight values and construction of the weight matrix through constructing a covariance matrix. The present invention further enriches the score function in terms of relation property by adding a weight matrix thereto.

Preferably, the step of constructing a mean matrix of the entities and the relations further comprises:

representing the vectors in different dimension and different importance levels, and computing their vector mean, respectively, thereby constructing mean matrixes for the entities and for the relations, respectively.

Preferably, the step of building an interpretability mechanism for a knowledge graph embedding model at least comprises:

performing dimensionality reduction on the entities by means of principal components analysis and representing them in an equipotential form in a two-dimension plane, so as to determine a modeling form of the entities corresponding to the relations;

setting up a limit constant, representing the entities and the relations in a complex plane, and proving their convergence based on properties of Euler transformation; and modelling the relations in a form of vectors, and performing formula derivation on at least one relation pair so as to account for its modelling ability and/or ability to reason complex relation pairs.

The present invention accounts for effectiveness and feasibility of the relation enhancement by building an interpretability mechanism for the knowledge graph embedding model and proving convergence of the knowledge graph embedding model.

Preferably, the method further comprising:

After the weight matrix is added into the score function, optimizing parameters by circularly performing negative sampling. By circularly performing the negative sampling to find a more suitable parameter.

Preferably, the method of computing the vector entropy values and weight values in at least one dimension comprises:

setting a training dataset triple $T=(T_1,T_2,\ldots,T_n)$, $T_i$ as a representation of a triple $(h_i,r_i,t_i)$, constructing the covariance matrix as:

$$M_c = \frac{1}{n}\sum_{i=1}^{n} \begin{bmatrix} h_i - \mu_{hi} \\ r_i - \mu_{ri} \\ t_i - \mu_{ti} \end{bmatrix} [h_i - \mu_{hi}, r_i - \mu_{ri}, t_i - \mu_{ti}], \mu_{*i},$$

corresponding to a vector average of a head entity, a relation, and a tail entity in every dimension, respectively;

computing the entropy value in the $j^{th}$ dimension:

$$e_j = -\frac{1}{lnm}\sum_{j=1}^{m} p_{ij}\ln(p_{ij}),$$

where, $p_{ij}$ represents the weight value, and $$p_{ij} = \frac{R_{ij}}{\sum_{j=1}^{m} R_{ij}},$$

$R_{ij}$ represents a set relation set.

Preferably, the method of constructing an initial weight matrix B further comprises:

$$B = \begin{bmatrix} \sqrt{b_1} & & \\ & \ddots & \\ & & \sqrt{b_n} \end{bmatrix},$$

where, a relative importance levels of the vector in each dimension is:

$$b_j = \frac{1-e_j}{\sum_{j=1}^{n}(1-e_j)}, e_j$$

representing the entropy value in the $j^{th}$ dimension.

Preferably, the score function is: $f_r(h,t)=(|h+r-t|^T)W(|h+r-t|)$, where, $W=B^T M_c^{-1} B$ represents the weight matrix based on the entropy value, T represents the training dataset triple, $T_i$ is a representation of the triple ($h_i$, $r_i$, $t_i$).

The obvious difference between the present invention and the prior art is that the present invention adds the weight matrix into the score function and uses vectors to represent triples (head entities, relations, and tail entities) of knowledge graphs. In the method of the present invention, entities and relations are dimensionally reduced into vectors that are then used as computing agents. With representations in the form of vectors, the present invention can accurately represent relation pairs of various kinds (such as symmetric relations, antisymmetric relations, combining relations, etc.). The present invention fundamentally improves quality of knowledge graph embedding, thereby significantly contributing to tasks like prediction and complementation.

The present invention further provides relation-enhancement knowledge graph embedding system, at least comprising processor, which is configurate:
  performing collaborative coordinate-transformation on entities in the knowledge graph;
  performing relation core enhancement by means of relation-entropy weighting, so as to endow entity vectors with strong relation property;
  building an interpretability mechanism for a knowledge graph embedding model, and accounting for effectiveness and feasibility of the relation enhancement by proving convergence of the knowledge graph embedding model; and
  using a dynamic parameter-adjusting strategy to perform representation learning to the vectors in the knowledge graph, and configuring deviation control to ensure accurate embedding.

The relation-enhancement knowledge graph embedding system of the present invention uses its processor to execute a program corresponding to the knowledge graph embedding method, so as to effectively and accurately predict and measure rationality of facts.

DETAILED DESCRIPTION OF THE INVENTION

The present invention will be further detailed below with reference to accompanying drawings.

The present invention provides a relation-enhancement knowledge graph embedding method and system and further provides the configuration method and application of the relation-enhancement knowledge graph embedding model.

The relation-enhancement knowledge graph embedding system of the present invention comprises at least one processor. The processor may also be provided as a number of processor modules.

The processor runs and executes a program of the relation-enhancement knowledge graph embedding method.

The present invention also provides an electronic device comprising at least a processor and a storage component, the processor running a program of the relation-enhancement knowledge graph embedding method stored by the storage component.

The present invention also provides a storage medium for storing the program of the relation-enhancement knowledge graph embedding method.

The processor is configurated:
  performing collaborative coordinate-transformation on entities in the knowledge graph;
  performing relation core enhancement by means of relation-entropy weighting, so as to endow entity vectors with strong relation property;
  building an interpretability mechanism for a knowledge graph embedding model, and accounting for effectiveness and feasibility of the relation enhancement by proving convergence of the knowledge graph embedding model; and
  using a dynamic parameter-adjusting strategy to perform representation learning to the vectors in the knowledge graph, and configuring deviation control to ensure accurate embedding.

When the processor consists of several modules, it is able to execute different steps of the program separately.

Figure 1:
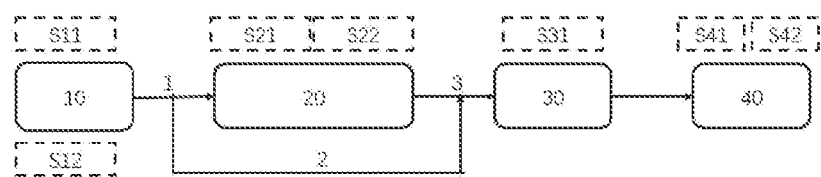
FIG. 1 is a structural diagram of an embedding model for a knowledge graph according to the present invention.

For example, as shown in FIG. 1, the first module 10 is used to perform collaborative transformation of coordinates on the entities of the knowledge graph, so as to achieve coordinate integration 1. The second module 20 is used to enhance relation cores by means of relation-entropy weighting, so as to endow entity vectors with strong relation property, so as to endow entity vectors with strong relation properties. The third module 30 is used to build an interpretability mechanism for the knowledge graph embedding model. The fourth module 40 is used to perform representation learning on vectors of the knowledge graph following a dynamic parameter-adjusting strategy, and set up deviation control so as to ensure accurate embedding.

In the present invention, the first module 10, the second module 20, the third module 30, and the fourth module 40 may each be a microprocessor, an application specific IC chip, or another processing elements capable of data processing.

Figure 2:
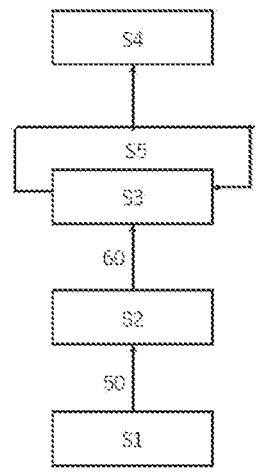
FIG. 2 is a schematic logic diagram of a training method for a knowledge graph embedding system according to the present invention.

The relation-enhancement knowledge graph embedding system of the present invention operates as illustrated in FIG. 2.

At S1, the original entity relation vectors are introduced into a continuous space, and the resulting entity/relation sets are used as inputs. In this process, positive definite matrix decomposition and Mahalanobis-distance normalization are performed to enhance association between relation pairs and entity pairs.

Therein, the training target of the knowledge graph embedding model is defined as a new score function. Particularly, the smaller the value of the score function is, the more likely the triple holds and the more accurate the link prediction is.

At S2, initialization is performed and a relation weight matrix 60 is obtained.

At S3, the relation weight matrix 2 is added into the score function, and negative sampling is performed circularly to optimize the parameters.

The step S4 comprises, according to embedding criteria, determining whether it is needed to update the embedding parameters to step the circulation, and if updating is not needed, the circulation ends.

In the present invention, to perform collaborative transformation of coordinates on the entities of the knowledge graph, the process described below is carried out.

The entities and relation data are projected into a continuous low-dimensional dense vector space. Positive definite matrix decomposition and Mahalanobis-distance normalization are performed to enhance association between relation pairs and entity pairs. Coordinates are integrated using Euler transformation to improve accuracy and semantic richness of representation of topological structures of entities corresponding to complex relations.

For example, Euler transformation is performed through: first, applying Euler transformation to coordinates of vectors with the aid of the natural logarithm and imaginary number unit in a complex space, then learning entity-related descriptive information from the perspective of the topological structure, and incorporating representation learning of complex relation pairs, so as to semantically enhance the vectors while improving accuracy of representing diverse structures of complex relation pairs.

At S11, positive definite decomposition is performed on the matrix.

For example, the feature value of the matrix is computed in consideration of positive definiteness and symmetry of the matrix. Decomposition facilitates limitation on correspondence of the entity/relation vectors in the semantic space to the positive-definite matrix and prevents excessive accumulation of deviation, making the process more accurate and complete.

At S12, Mahalanobis-distance normalization is performed on the matrix.

The feature values as the result of positive definite decomposition are incorporated to compute the association levels among different properties (feature values), so as to eliminate interference caused by relevance among the entity/relation vectors and in turn enhance association between relations and entities.

By processing the matrix composed of the entity vectors with QS positive definite decomposition, then normalizing the Mahalanobis distances, and at last integrating entity coordinates through Euler transformation, the present invention can make representation of topological structures of entities corresponding to complex relations more accurate.

At S21, relation core enhancement is conducted by means of relation-entropy weighting, and a covariance matrix is constructed based on the relations.

S22 involves computing vector entropy values and weights in every dimension, and then constructing a weight matrix.

Specifically, weighting is performed on the entities in the knowledge graph around the relation pairs, so as to obtain vector entropy values and weights in at least one dimension.

For example, KL divergence is built on the basis of relations, and vector entropy values and weights in every dimension are computed.

Assuming a training dataset triple $T=(T_1,T_2,\ldots,T_n)$, where every $T_i$ is a representation of a triple $(h_i,r_i,t_i)$, the relation is used as the starting point to set a relation set $\{R_{ij}\}=[r_{i1},\ldots,r_{im}]$, where $r_{i1},\ldots,r_{im}$ corresponds to the relations in m dimensions.

The covariance matrix is defined as:

$$M_c = \frac{1}{n}\sum_{i=1}^{n} \begin{bmatrix} h_i - \mu_{hi} \\ r_i - \mu_{ri} \\ t_i - \mu_{ti} \end{bmatrix} [h_i - \mu_{hi}, r_i - \mu_{ri}, t_i - \mu_{ti}],$$

where $\mu_{*i}$ corresponds to an average of vectors of the head entity, the relation, and the tail entity in every dimension.

The weight value of one dimension is $$p_{ij} = \frac{R_{ij}}{\sum_{j=1}^{m} R_{ij}}.$$

that is, based on the relation $R_{ij}$, the weight value $p_{ij}$ of the dimension can be obtained.

Then the entropy value is computed using the weight value $p_{ij}$, $$e_j = -\frac{1}{lnm}\sum_{j=1}^{m} p_{ij}\ln(p_{ij}),$$

where $e_j$ represents the entropy value in the $j^{th}$ dimension. The smaller the entropy value is, the greater the weight value is.

Vectors of different dimensions and of different importance levels are represented. Every vector is represented by the represent of its numeral values in the semantic space (represented by the vector space), and then the mean is calculated and used together with the representational form of the subsequent covariance to construct a mean matrix.

For example, the vector is represented as:

$$\begin{bmatrix} h_i - \mu_{hi} \\ r_i - \mu_{ri} \\ t_i - \mu_{ti} \end{bmatrix}$$

and $$[h_i - \mu_{hi}, r_i - \mu_{ri}, t_i - \mu_{ti}].$$

The corresponding covariance is selected for construction of the covariance matrix.

For example, the step of selecting the corresponding covariance comprises: selecting the vector having the least data vacancies, and marking a data vacancy with a random number ranging between 0 and 1. With the covariance so selected, the vector can be complemented, and the mean corresponding to the vectors of the head entity, the relation, and the tail entity can be calculated, eventually realizing computing of the covariance matrix.

The weight value is computed based on the vector entropy value in at least one dimension, and a diagonalized matrix is constructed. The weight matrix formed by combining the diagonalized matrix and the covariance matrix is added into the score function, and models are constructed for different importance levels of entities.

Specifically, the weight value $p_{ij}$ of different dimensions is incorporated for computing the entropy value $e_j$. A diagonalized matrix is constructed according to the feature values, and then the diagonalized matrix and the covariance matrix are combined to form the final weight matrix.

The relative importance levels of vectors in different dimensions are represented as a feature value $b_j$, $$b_j = \frac{1 - e_j}{\sum_{j=1}^{n}(1 - e_j)}.$$

That is, the feature value $b_j$ can be calculated from the entropy value $e_j$.

The diagonalized matrix B in the $j^{th}$ dimension is constructed using the feature value $b_j$. B is the initial weight matrix.

$$B = \begin{bmatrix} \sqrt{b_1} & & \\ & \ddots & \\ & & \sqrt{b_n} \end{bmatrix},$$

where n represents the total number of dimensions, $j \in [1, 2, \ldots, n]$.

The weight matrix is added to the score function to make the latter rich in relation properties, and a model is built for different importance levels of entities.

The diagonalized matrix and the covariance matrix are combined to form a weight matrix W, $W = B^T M_c^{-1} B$. W represents the weight matrix based on the entropy value, and is the final weight matrix. The matrix obtained by combining the covariance matrix $M_c$, that contains entities and vectors and the initial weight matrix that contains entropy value representations is the final entropy-based weight matrix.

The weight matrix is substituted into the score function to get:

$$f_r(h,t) = (|h+r-t|^T) B^T M_c^{-1} B(|h+r-t|) = (|h+r-t|^T) W(|h+r-t|).$$

After the weight matrix is added into the score function, optimization of parameters is achieved by circularly performing the negative sampling operation.

The present invention enhances relations by means of relation-entropy weighting, so as to increase semantic richness of representational vectors of knowledge graph topological structures. Besides, the present invention uses the covariance matrix constructed from relations to allow computing of vector entropy values and weights in every dimension, thereby providing a weight matrix that has never seen in the prior art.

An interpretability mechanism is built for the knowledge graph embedding model, and effectiveness and feasibility of the relation enhancement are manifested by proving the convergence of the knowledge graph embedding model.

Dimensional reduction of entities is then achieved through principal components analysis and the entities are represented in a two-dimension plane in the equipotential form, so as to determine the form for modeling the entities corresponding to the relations.

For example, at S31, transformation of the equipotential surface is conducted.

To do this, some example relations are selected to form a visualized embedding equipotential surface. As shown in FIG. 3~FIG. 6, the original mode $f_r(h,t) = \|h+r-t\|_2$ generates a round equipotential surface. After ordinary entity weighting, it becomes an elliptic equipotential surface f, which may be helpful to prevent entity mismatch, but the performance is not adequate.

Therefore, collaborative transformation of coordinates is first conducted to rotate the coordinates and make the equipotential surface round again. At this time, relation-entropy weighting is performed to further improve the equipotential surface into the elliptic equipotential surface f, and more errors have been prevented, thereby improving accuracy. Additionally, by comparing FIG. 3 and FIG. 6, it can be found that mismatch of triples was significantly reduced.

Figure 3:
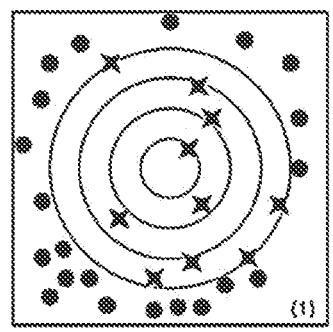
FIG. 3 provide schematic visualization of an equipotential surface in its initial state according to the present invention.

In FIG. 3 through FIG. 6, an asterisk represents a wrong triple, and a round dot represents a right triple, while a curve represents an equipotential surface. FIG. 3 provide visualization of the initial equipotential surface, and the corresponding model is TransE.

Figure 4:
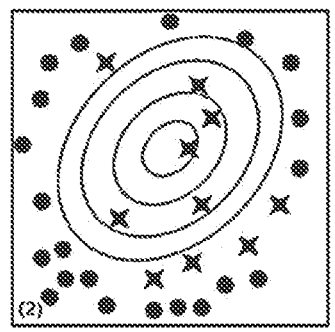
FIG. 4 provides schematic visualization of the equipotential surface after the first Mahalanobis-distance weighting according to the present invention.

The triples embedded into the equipotential surface shown in FIG. 3 are represented as triples embedded into the equipotential surface shown in FIG. 4 after undergoing the first Mahalanobis-distance weighting. The equipotential surface is then an elliptical equipotential surface. At the time of FIG. 4, the number of the wrong triples, or the asterisks, decreased to 6 from 10 in FIG. 3.

Figure 5:
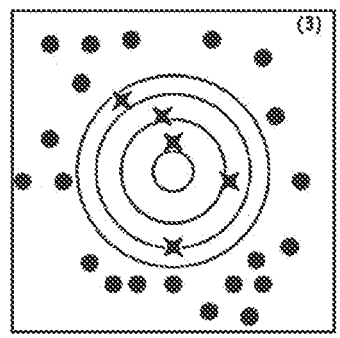
FIG. 5 provides schematic visualization of the equipotential surface after the first collaborative transformation of coordinates according to the present invention.

The triples embedded into the equipotential surface shown in FIG. 4 are represented as triples embedded into the equipotential surface shown in FIG. 5 after undergoing the first collaborative transformation of coordinates. In FIG. 5, the equipotential surface returned to the round shape.

Figure 6:
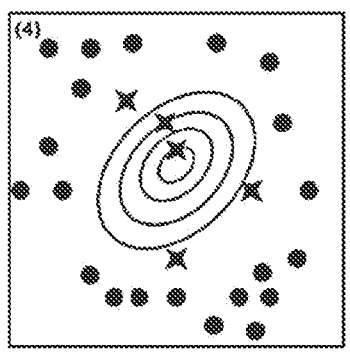
FIG. 6 provides schematic visualization of the equipotential surface after entropy weighting according to the present invention.

The triples embedded into the equipotential surface shown in FIG. 5 became the triples embedded into the equipotential surface shown in FIG. 6 after undergoing entropy weighting. At this time, the number of the wrong points, or the asterisk, in the elliptical equipotential surface reduced to 2. As compared to the initial state shown in FIG. 3, mismatched triples were significantly reduced.

A limit constant is set, and the entities and the relations are represented in a complex plane, so as to prove its convergence based on properties of Euler transformation.

Since this model is derived from TransE, to share similar training and reasoning, it is necessary to prove that the score function of TransCE converges to TransE, and then the equation can be expanded to a complex plane.

For example, with the aid of trigonometric functions and Eulerian properties, it is proven that:

$$\lim_{\lambda \to 0} |h + r - t|^T W |h + r - t| = |h + r - t|,$$

thereby accomplishing proof.

Relations are molded in the form of vectors, and formula derivation is performed on at least one relation pair to account for the ability to reason complex relation pairs.

For example, a function and its inverse are used to respectively prove that a satisfying symmetric/antisymmetric equation is satisfied: $r(h,t)=r(t,h)$. If $r_1(h,t) \subseteq r_2(t,h), r_1(h,t) \supseteq r_2(t,h), r_1=r_2$, it is antisymmetric;

Inverse equation: $r_1(h,t)=r_2(t,h)$;

Combined equation: $r_1(h_1,t_1)=r_2(h_1,t_1) \circ r_3(h_1,t_1)$.

The properties of an orthogonal matrix where ($M_S \cdot M_S^T = I$, $M_S$ is a matrix of properties of an orthogonal relation) are combined to prove:

Symmetric/antisymmetric relation: $M_S = M_S^T$;

Inverse relation: $M_{S_{r1}} = M_{S_{r2}}^{-1}$;

Combined relation: $M_{S_{r1}} = M_{S_{r2}} \circ M_{S_{r3}}$, thereby proving interpretability.

The present invention includes formula reasoning for complex relation pairs to determine the modeling form of the entities. An interpretability mechanism is built for the model so that effectiveness and feasibility of the relation enhancement are manifested by proving the convergence of the model.

A dynamic parameter-adjusting strategy is adopted for representation learning of the vectors in the knowledge graph, and deviation control is set so as to ensure accurate embedding.

Deviation control is related to relation vector features. In other words, for complex relation pairs, the greater the importance level, or the weight, of an entity is, the higher the requirement for accurate deviation control is.

Specifically, the entropy values, the weights, and the corresponding entity vectors of relations are initialized to optimize the round equipotential surface they embed into an elliptic one. Then embedding model of the embedding knowledge graph is cored according to the score function.

By observing the optimal rationality of facts, the parameters of the knowledge graph embedding model can be estimated to achieve the optimal model to enhance accuracy of knowledge representation, thereby accomplishing subsequent reasoning and complementation tasks for the knowledge graph.

For example, a knowledge graph reasoning task is optimized through triple typing and link prediction.

As shown in FIG. 2, the triple A set is taken as the input, and transformed into S through coordinate collaborative transformation. Then the relations are subjected to normal transformation and normalization, $$r \leftarrow \text{uniform}\left(-\frac{6}{\sqrt{d}}, \frac{6}{\sqrt{d}}\right),$$

$$r \leftarrow \text{Normalize}(r).$$

The parameter values of the weight model are initialized. With a circle, the normalized head- and tail-entity vectors are subjected to negative sampling $(\bar{h}, r, \bar{t}) \leftarrow$ Sampling negative triples $(S'(\bar{h},r,\bar{t}))$, while keeping updating the embedding parameters according to determination criteria.

For example, the update may be in the form of:

$$\nabla_{\overline{(\bar{h},r,\bar{t},\bar{h}',\bar{t}')}}\left\{\sum_S \sum_{S'} [f_r(h, t) + \gamma - f_{r'}(h', t')]_+ + \lambda_1\left(\sum_{E'} \|e\|^2\right) + \lambda_2\left(\sum_R \|r\|^2\right) + \lambda\left(\sum \|W\|_F^2\right)\right\}.$$

If $f_r(h,t)+\gamma-f_{r'}(h', t') \geq 0$, updating is performed until a suitable parameter is found to optimizes the target function.

In one specific embodiment, the disclosed relation-enhancement knowledge graph embedding method is loaded in an Intel Xeon E5-2695V4 CPU, which is installed in a local server of the type Dell R730. There are also a corresponding memory (128 GB DDR4 RAM) and hard disk (1 TB SSD+4 TB HDD) in this developing environment.

In one specific embodiment, the disclosed relation-enhancement knowledge graph embedding method is applied on a scientific resource search platform. When a user is searching for articles or patents on the platform, a knowledge graph could be used to automatically recommend literature of the related field according to user preference. In this scenario, a node represents important information such as title of the article or the patent, or name of the author; an edge represents the fact that the author belongs to a certain facility, or the company belongs to a certain country. An entity and a relation could represent visualizable node and edge in the knowledge graph. An attribute represents basic information, for example, date of birth of a certain specialist during the search. A concept could represent an abstract, an introduction, or an interpretation of the article or the patent obtained from the knowledge graph.

In one specific embodiment, the processor loaded with the disclosed relation-enhancement knowledge graph embedding method could process structured data, such as texts, tables or triples. It could also process mysql database. These data can be directly acquired through an interface of a cloud server in an interactive manner. A knowledge-graph engine can be constructed through a Java system at the backend, whereby interactive logistic and data analysis between the front end and the back end can be realized. Distributed search and analysis can be achieved by constructing an industrial grade ElasticSearch. The process directly calls the data from hard disks in the disk array.

In one specific embodiment, after processing, the processed data is sent to a hard disk of the server and stored in the database. A data management system re-organizes and manages the data, providing versatile data searching services including vague search, precise search, multi-condition search, as well as all-round data analysis services including statistics, sorting and summarizing, which can then be applied to development of the resource platform and research of common key technology of modern service industry.

In one specific embodiment, after processing, the processed data is sent to a database interface of a hard disk of a backend disk array, then ElasticSearch is used to construct a search subsystem and an analytical and statistical subsystem, Graph Pattern Mining is used to construct a knowledge graph model graph subsystem, Subgraph Mining is used to construct associated subgraph subsystem. In this way, data is processed and presented as a knowledge graph, i.e., the knowledge graph is developed in a SpringBoot Web framework, presented by javaScript at the front end, and UI is realized by HTML and CSS.

It should be noted that the above-mentioned specific embodiments are exemplary, and those skilled in the art can come up with various solutions inspired by the disclosure of the present invention, and those solutions also fall within the disclosure scope as well as the protection scope of the present invention. It should be understood by those skilled in the art that the description of the present invention and the accompanying drawings are illustrative rather than limiting to the claims. The protection scope of the present invention is defined by the claims and their equivalents. The description of the present invention contains a number of inventive concepts, such as "preferably", "according to a preferred embodiment" or "optionally", and they all indicate that the corresponding paragraph discloses an independent idea, and the applicant reserves the right to file a divisional application based on each of the inventive concepts.

What is claimed is:

1. A relation-enhancement knowledge graph embedding method, at least comprising:
   performing collaborative coordinate-transformation on entities in the knowledge graph;
   performing relation core enhancement by means of relation-entropy weighting, so as to endow entity vectors with strong relation property;
   building an interpretability mechanism for a knowledge graph embedding model, and accounting for effectiveness and feasibility of the relation enhancement by proving convergence of the knowledge graph embedding model; and
   using a dynamic parameter-adjusting strategy to perform representation learning to the vectors in the knowledge graph, and configuring deviation control to ensure accurate embedding.

2. The relation-enhancement knowledge graph embedding method of claim 1, wherein the step of performing collaborative coordinate-transformation on entities in the knowledge graph at least comprises:
   projecting the entities and relation data to a low-dimensional dense vector space,
   performing positive definite matrix decomposition and Mahalanobis-distance normalization, so as to enhance association between relation pairs and entity pairs; and
   integrating the coordinates using Euler transformation, so as to improve accuracy and semantic richness in representing an entity topological structure corresponding to complex relations.

3. The relation-enhancement knowledge graph embedding method of claim 2, wherein step of performing relation core enhancement by means of relation-entropy weighting at least comprises:
   weighting the entities in the knowledge graph around the relation pairs so as to obtain vector entropy values and weights in at least one dimension;
   constructing a mean matrix of the entities and the relations, selecting corresponding covariances, and constructing a covariance matrix; and
   computing weight values based on the vector entropy values in at least one dimension and constructing a diagonalized matrix, adding a weight matrix that is formed by combining the diagonalized matrix and the covariance matrix into a score function, and modeling different importance levels of the entities.

4. The relation-enhancement knowledge graph embedding method of claim 3, wherein the step of constructing a mean matrix of the entities and the relations further comprises:
   representing the vectors of different dimension and different importance levels, and computing their vector mean, respectively, thereby constructing mean matrixes for the entities and for the relations, respectively.

5. The relation-enhancement knowledge graph embedding method of claim 4, wherein the step of building an interpretability mechanism for a knowledge graph embedding model at least comprises:
   performing dimensionality reduction on the entities by means of principal components analysis and representing them in an equipotential form in a two-dimension plane, so as to determine a modeling form of the entities corresponding to the relations;
   setting up a limit constant, representing the entities and the relations in a complex plane, and proving their convergence based on properties of Euler transformation; and
   modelling the relations in a form of vectors, and performing formula derivation on at least one relation pair so as to account for its modelling ability and/or ability to reason complex relation pairs.

6. The relation-enhancement knowledge graph embedding method of claim 5, further comprising:
   after the weight matrix is added into the score function, optimizing parameters by circularly performing negative sampling.

7. The relation-enhancement knowledge graph embedding method of claim 6, wherein the method of computing the vector entropy values and weight values in at least one dimension comprises:
   setting a training dataset triple $T=(T_1, T_2, \ldots, T_n)$, $T_i$ as a representation of a triple $(h_i, r_i, t_i)$,
   constructing the covariance matrix as:

$$M_c = \frac{1}{n}\sum_{i=1}^{n}\begin{bmatrix} h_i - \mu_{hi} \\ r_i - \mu_{ri} \\ t_i - \mu_{ti} \end{bmatrix}[h_i - \mu_{hi}, r_i - \mu_{ri}, t_i - \mu_{ti}], \mu_{*i},$$

corresponding to a vector average of a head entity, a relation, and a tail entity of every dimension, respectively;
   computing the entropy value in the $j^{th}$ dimension:

$$e_j = -\frac{1}{\ln m}\sum_{j=1}^{m} p_{ij}\ln(p_{ij}),$$

where, $p_{ij}$ represents the weight value, and $$p_{ij} = \frac{R_{ij}}{\sum_{j=1}^{m} R_{ij}},$$

$R_{ij}$ represents a set relation set.

8. The relation-enhancement knowledge graph embedding method of claim 7, wherein the method of computing the vector entropy values and weight values in at least one dimension further comprises: constructing an initial weight matrix B:

$$B = \begin{bmatrix} \sqrt{b_1} & & \\ & \ddots & \\ & & \sqrt{b_n} \end{bmatrix},$$

where, a relative importance levels of the vector in each dimension is:

$$b_j = \frac{1-e_j}{\sum_{j=1}^{m}(1-e_j)},$$

$$e_j$$

representing the entropy value in the $j^{th}$ dimension.

9. The relation-enhancement knowledge graph embedding method of claim 8, wherein the score function is: $f_r(h,t)=(|h+r-t|^T)W(|h+r-t|)$, where, $W=B^T M_c^{-1} B$ represents the weight matrix based on the entropy value, T represents the training dataset triple, $T_i$ is a representation of the triple $(h_i, r_i, t_i)$.

10. The relation-enhancement knowledge graph embedding method of claim 9, wherein dimensional reduction of entities is achieved through principal components analysis and the entities are represented in a two-dimension plane in the equipotential form, so as to determine the form for modeling the entities corresponding to the relations.

11. A relation-enhancement knowledge graph embedding system, at least comprising processor, which is configured to:
    perform collaborative coordinate-transformation on entities in the knowledge graph;
    perform relation core enhancement by means of relation-entropy weighting, so as to endow entity vectors with strong relation property;
    build an interpretability mechanism for a knowledge graph embedding model, and account for effectiveness and feasibility of the relation enhancement by proving convergence of the knowledge graph embedding model; and
    use a dynamic parameter-adjusting strategy to perform representation learning to the vectors in the knowledge graph, and configure deviation control to ensure accurate embedding.

12. The relation-enhancement knowledge graph embedding system of claim 11, wherein the processor is further configured to:
    project the entities and relation data to a low-dimensional dense vector space,
    perform positive definite matrix decomposition and Mahalanobis-distance normalization, so as to enhance association between relation pairs and entity pairs; and
    integrate the coordinates using Euler transformation, so as to improve accuracy and semantic richness in representing an entity topological structure corresponding to complex relations.

13. The relation-enhancement knowledge graph embedding system of claim 12, wherein when performing step of performing relation core enhancement by means of relation-entropy weighting, the processor is configured to:
    weight the entities in the knowledge graph around the relation pairs so as to obtain vector entropy values and weights in at least one dimension;
    construct a mean matrix of the entities and the relations, select corresponding covariances, and construct a covariance matrix; and
    compute weight values based on the vector entropy values in at least one dimension and construct a diagonalized matrix, add a weight matrix that is formed by combining the diagonalized matrix and the covariance matrix into a score function, and model different importance levels of the entities.

14. The relation-enhancement knowledge graph embedding system of claim 13, wherein when performing the step of constructing a mean matrix of the entities and the relations, the processor is further configured to:
    represent the vectors of different dimension and different importance levels, and compute their vector mean, respectively, thereby constructing mean matrixes for the entities and for the relations, respectively.

15. The relation-enhancement knowledge graph embedding system of claim 14, wherein when performing the step of building an interpretability mechanism for a knowledge graph embedding model, the processor is configured to:
    perform dimensionality reduction on the entities by means of principal components analysis and representing them in an equipotential form in a two-dimension plane, so as to determine a modeling form of the entities corresponding to the relations;
    set up a limit constant, representing the entities and the relations in a complex plane, and prove their convergence based on properties of Euler transformation; and
    model the relations in a form of vectors, and perform formula derivation on at least one relation pair so as to account for its modelling ability and/or ability to reason complex relation pairs.

16. The relation-enhancement knowledge graph embedding system of claim 15, the processor is further configured to:
    after the weight matrix is added into the score function, optimize parameters by circularly performing negative sampling.

17. The relation-enhancement knowledge graph embedding system of claim 16, wherein the method of computing the vector entropy values and weight values in at least one dimension comprises:
    setting a training dataset triple $T=(T_1, T_2, \ldots, T_n)$, $T_i$ as a representation of a triple $(h_i, r_i, t_i)$, constructing the covariance matrix as:

$$M_c = \frac{1}{n}\sum_{i=1}^{n}\begin{bmatrix} h_i - \mu_{hi} \\ r_i - \mu_{ri} \\ t_i - \mu_{ti} \end{bmatrix}[h_i - \mu_{hi}, r_i - \mu_{ri}, t_i - \mu_{ti}],$$

$\mu_{*i}$, corresponding to a vector average of a head entity, a relation, and a tail entity of every dimension, respectively; computing the entropy value in the $j^{th}$ dimension:

$$e_j = -\frac{1}{\ln m}\sum_{j=1}^{m} p_{ij}\ln(p_{ij}),$$

where, $P_{ij}$ represents the weight value, and $$p_{ij} = \frac{R_{ij}}{\sum_{j=1}^{m} R_{ij}},$$

$R_{ij}$ represents a set relation set.

18. The relation-enhancement knowledge graph embedding system of claim 17, wherein when performing the method of computing the vector entropy values and weight values in at least one dimension, the processor is further configured to: construct an initial weight matrix B:

$$B = \begin{bmatrix} \sqrt{b_1} & & \\ & \ddots & \\ & & \sqrt{b_n} \end{bmatrix},$$

where, a relative importance levels of the vector in each dimension is:

$$b_j = \frac{1-e_j}{\sum_{j=1}^{n}(1-e_j)},$$

$e_j$ representing the entropy value in the $j^{th}$ dimension.

19. The relation-enhancement knowledge graph embedding system of claim 18, wherein the score function is:
$f_r(h,t)=(|h+r-t|^T)W(|h+r-t|)$,
where, $W=B^T M_c^{-1} B$ represents the weight matrix based on the entropy value, T represents the training dataset triple, $T_i$ is a representation of the triple $(h_i, r_i, t_i)$.

20. The relation-enhancement knowledge graph embedding system of claim 19, wherein dimensional reduction of entities is achieved through principal components analysis and the entities are represented in a two-dimension plane in the equipotential form, so as to determine the form for modeling the entities corresponding to the relations.

* * * * *